United States Patent
Werness et al.

(10) Patent No.: US 9,598,549 B2
(45) Date of Patent: Mar. 21, 2017

(54) FUNCTIONALIZED OLIGOMERS

(71) Applicant: Dow Global Technologies LLC, Midland, MI (US)

(72) Inventors: Jenny Werness, Midland, MI (US); Kshitish Patankar, Midland, MI (US); Mark Sonnenschein, Midland, MI (US); Xin Jin, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 134 days.

(21) Appl. No.: 14/427,013

(22) PCT Filed: Sep. 16, 2013

(86) PCT No.: PCT/US2013/059986
§ 371 (c)(1),
(2) Date: Mar. 10, 2015

(87) PCT Pub. No.: WO2014/052081
PCT Pub. Date: Apr. 3, 2014

(65) Prior Publication Data
US 2016/0208066 A1 Jul. 21, 2016

Related U.S. Application Data

(60) Provisional application No. 61/706,813, filed on Sep. 28, 2012.

(51) Int. Cl.
| | | |
|---|---|---|
| *C07C 49/203* | (2006.01) | |
| *C08J 9/00* | (2006.01) | |
| *C08G 65/14* | (2006.01) | |
| *C08J 9/14* | (2006.01) | |
| *C08G 65/332* | (2006.01) | |
| *C08K 5/31* | (2006.01) | |

(52) U.S. Cl.
CPC ............ *C08J 9/147* (2013.01); *C08G 65/332* (2013.01); *C08G 65/3322* (2013.01); *C08G 65/3326* (2013.01); *C08J 9/141* (2013.01); *C08J 9/142* (2013.01); *C08J 9/146* (2013.01); *C08K 5/31* (2013.01); *C08G 2650/30* (2013.01); *C08J 2203/12* (2013.01); *C08J 2203/14* (2013.01); *C08J 2203/142* (2013.01); *C08J 2205/05* (2013.01); *C08J 2371/00* (2013.01)

(58) Field of Classification Search
None
See application file for complete search history.

(56) References Cited

U.S. PATENT DOCUMENTS

| | | | |
|---|---|---|---|
| 3,305,019 A * | 2/1967 | Katzer | C09K 8/882 166/310 |
| 4,871,822 A | 10/1989 | Brindoepke et al. | |
| 7,919,540 B2 | 4/2011 | Heuts et al. | |
| 2005/0081994 A1 | 4/2005 | Beckley et al. | |
| 2006/0247374 A1 | 11/2006 | Beckley et al. | |
| 2007/0173602 A1 | 7/2007 | Brinkman et al. | |
| 2008/0132596 A1 | 6/2008 | Heuts et al. | |
| 2008/0281006 A1 * | 11/2008 | O;Leary | C08J 9/00 521/76 |
| 2009/0275713 A1 | 11/2009 | Shah et al. | |
| 2015/0025164 A1 * | 1/2015 | Golini | C08G 18/4829 521/107 |

FOREIGN PATENT DOCUMENTS

| | | |
|---|---|---|
| CN | 101942088 | 1/2011 |
| GB | 1154726 | 6/1969 |

\* cited by examiner

*Primary Examiner* — Kara Boyle
(74) *Attorney, Agent, or Firm* — Brooks, Cameron & Huebsch, PLLC

(57) ABSTRACT

Embodiments of the present disclosure are directed towards functionalized oligomers. As an example, a functionalized oligomer can be represented of Formula (I): (Formula I) in which $R^1$ is a structure of Formula II: (Formula II) and $R^2$ has a formula —$C_xH_yO$—, wherein n is an integer having a value from 2 to 6, m is an integer having a value from 2 to 10, X independently is an integer having a value from 1 to 12, and Y is an integer having a value from 2 to 24.

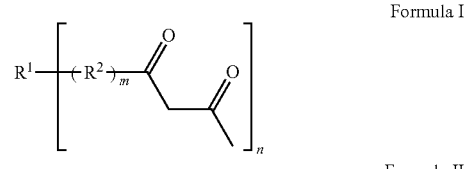

Formula I

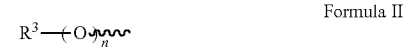

Formula II

12 Claims, No Drawings

FUNCTIONALIZED OLIGOMERS

This application is a National Stage Application under 35 U.S.C. §371 of International Application Number PCT/US2013/059986, filed Sep. 16, 2013 and published as WO 2014/052081 on Apr. 3, 2014, which claims the benefit to U.S. Provisional Application 61/706,813, filed Sep. 28, 2012, the entire contents of which are incorporated herein by reference in its entirety.

FIELD OF DISCLOSURE

Embodiments of the present disclosure are directed functionalized oligomers, more specifically, embodiments are directed towards functionalized oligomers that may be utilized in an open-cell foam forming composition.

BACKGROUND

Foams are dispersions in which a gas is dispersed in a liquid material, a solid material, or a gel material. Solid foams include closed-cell foams and open-cell foams.

In closed-cell foam, the gas forms discrete pockets, where the discrete pockets are completely surrounded by the solid material. The closed cells may be referred to as non-intercommunicating. Because the discrete pockets are completely surrounded by the solid material, the closed cells form a rigid material, e.g., a rigid foam. Additionally, the closed cells help to prevent passage of gases or liquids through the closed-cell foam. Closed-cell foams are used in a variety of applications, such as thermal insulation, vapor insulation, liquid insulation, joint filling application, and impact protection applications, among others.

In contrast to closed-cell foam, in an open-cell foam the gas pockets connect with each other. The open cells may be referred to as intercommunicating. Because the gas pockets of an open-cell foam are not completely surrounded by the solid material, the open cells can form a flexible material, e.g., a flexible foam or a viscoelastic foam. Open-cell foams are used in a variety of applications, such as some insulation application, packaging applications, automotive trim, filters, and acoustic applications, among others.

SUMMARY

The present disclosure provides functionalized oligomers of Formula (I):

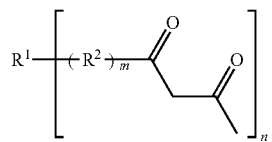
(Formula I)

in which $R^1$ is a structure of Formula II:

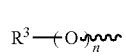
(Formula II)

and $R^2$ has a formula —$C_xH_yO$—, wherein n is an integer having a value from 2 to 6, m is an integer having a value from 2 to 10, X independently is an integer having a value from 1 to 12, and Y is an integer having a value from 2 to 24. $R^3$ can be an aliphatic compound, an aromatic compound, or an amine compound.

The present disclosure provides open-cell foam forming composition. The open-cell foam forming compositions can include the functionalized oligomer as provided herein and a multifunctional Michael acceptor.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Functionalized oligomers are described herein. These functionalized oligomers can be included in open-cell foam forming compositions that can provide an open-cell foam. Unlike some other foams, such as polyurethane foams, the open-cell foams disclosed herein advantageously do not utilize isocyanates, which may be undesirable for some applications. The open-cell foams disclosed herein advantageously are foams having properties, such as foam density, among others, that are desirable for some applications. The open-cell foams disclosed herein can be employed for a variety of applications, such as some insulation applications, packaging applications, automotive trim applications, filter applications, and acoustic applications, among others.

The functionalized oligomers described herein can be represented by the following Formula I:

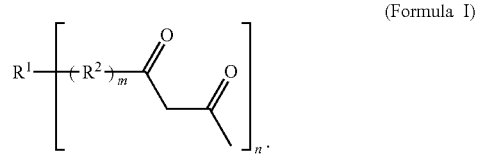
(Formula I)

$R^1$ can be represented by the following Formula II:

(Formula II)

and $R^2$ has a formula —$C_xH_yO$—. As used herein, n is an integer having a value from 2 to 6, m is an integer having a value from 3 to 10, X is an integer having a value from 1 to 12, and Y is an integer having a value from 2 to 24. $R^3$ can be an aliphatic compound, an aromatic compound, or an amine compound. It is appreciated that the values for n, m, X and Y for mixtures of the functionalized oligomers of Formula (I) can be a rational number for the given ranges of n, m, X and Y provided herein. The wavy bond (∿∿∿) in Formula II represents a mixture of different possible stereochemistry at that point.

As an example, $R^1$, of the functionalized oligomer represented by Formula I, can have a structure of Formula III, (Formula III)

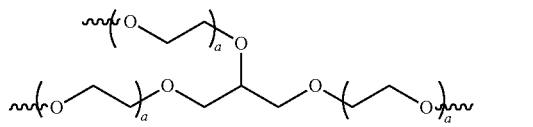

for instance, where n has a value of 3, m has a value of 2 or 3, a has a value of 2 or 3, X has a value of 2, and Y has a value of 4.

As an example, $R^1$, of the functionalized oligomer represented by Formula I, can have a structure represented by Formula IV, (Formula IV)

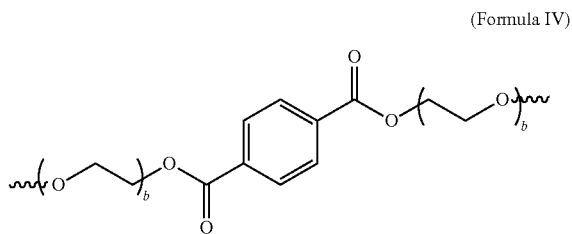

for instance, where n has a value of 2, m has a value of 3 to 4, b has a value of 3 to 4, X has a value of 2, and Y has a value of 4.

The functionalized oligomers, which can also be referred to as acetoacetate oligomers and/or Michael donors, can be formed from a chemical reaction, e.g., via a transesterification reaction. The transesterification reaction can include a polyol and an ester.

As used herein, "polyol" refers to an organic molecule having an average of greater than 1.0 hydroxyl groups per molecule. A variety of polyols that can be utilized to form the functionalized oligomers are commercially available, such as IP-625, an ethoxylated glycerol, and IP-9001, an ethoxylated terephthalic acid, both available from the Dow Chemical Company, among other commercially available polyols. A variety of polyols that can be utilized to form the functionalized oligomers can be formed from a chemical reaction, e.g., via alkoxylation reaction. The alkoxylation reaction can include reacting an initiator such as, water, ethylene glycol, or propylene glycol, with an alkylene oxide, such as ethylene oxide, propylene oxide, or butylene oxide in the presence of a catalyst. Examples of the polyol employed to form the functionalized oligomers include, but are not limited to, ethoxylated glycerol, ethoxylated terephthalic acid, poly(tetramethylene glycol), polycaprolactone, poly(butylenes oxide), poly hydroxy isobutylenes (Krasol polyols), castor oil (triglyceride of ricin oleic acid), polyols of hydroformylated and reduced seed oils, ethoxylated aromatic phenols, hydroquinone dietherethanol, and combinations thereof, among other polyols.

A variety of esters can be utilized to form the functionalized oligomers. The ester can be an acetoacetate ester, a cyanoacetate ester, a malonic acid ester, or a combination thereof, among other esters. Examples of the ester include, but are not limited to, tert-butyl 3-oxobutyrate, esters of polyhydric alcohols such as ethylene glycol, 1,2- or 1,3-propane diol, 1,4-butane diol, 1,2-butanediol, 1,6-hexanediol, neopentyl glycol, 2-methyl-1,3-propane diol, diethylene glycol, triethylene glycol, dipropylene glycol, tripropylene glycol, poly(propylene glycol), poly(ethylene glycol), cyclohexanedimethanol, trimethylol propane, triethylol propane, pentaerythritol, glycerin, glycerol, dipentaerythritol, di-trimethylolpropane, glucose, isosorbide, butyl ethyl propanediol, and combinations thereof, among others.

The polyol and the ester can be reacted such that the hydroxyl groups of the polyol and the ester have a molar ratio of 0.5 moles of hydroxyl groups of the polyol:2.0 moles of ester to 2.0 moles of hydroxyl groups of the polyol:0.5 moles of ester. All individual values and subranges from and including 0.5:2.0 (moles of hydroxyl groups of the polyol: moles of ester) to 2.0:0.5 (moles of hydroxyl groups of the polyol:moles of ester) are included herein and disclosed herein; for example, the polyol and the ester can be reacted such that the mole ratio of moles of hydroxyl groups of the polyol to moles of ester has an upper limit of 2.0:0.5, 1.5:0.5, or 1.0:0.5 to a lower limit of 0.5:2.0, 1.0:2.0, or 1.5:2.0.

The polyol and the ester can be heated to a temperature from 80 degrees Celsius (° C.) to 200° C., e.g., when forming the functionalized oligomers via the transesterification reaction. All individual values and subranges from and including 80° C. to 200° C. are included herein and disclosed herein; for example, the polyol and the ester can be heated to a temperature with a lower limit of 80° C., 90° C., or 115° C. to an upper limit of 200° C., 175° C., or 150° C.

The polyol and the ester can be heated to a temperature, as discussed herein, for a time interval from 0.5 hours to 10 hours. All individual values and subranges from and including 0.5 hours to 10 hours are included herein and disclosed herein; for example, the polyol and the ester can be heated to a temperature, as discussed herein, for a time interval with a lower limit of 0.5 hours, 1.0 hours, or 1.5 hours to an upper limit of 10.0 hours, 9.0 hours, or 8.0 hours. However, the polyol and the ester can be heated to a temperature, as discussed herein, for other time intervals for some applications.

The functionalized oligomer can have an equivalent weight of 200 grams/equivalent to 5000 grams/equivalent. As used herein, "equivalent weight" is defined as the number average molecular weight of the functionalized oligomer divided by the functionality of the functionalized oligomer. Functionality as used herein is equal to the number of acetoacetate groups in the functionalized oligomer, which is also equal to the number of hydroxyl groups in the starting material. Determine the number average molecular weight of the functionalized oligomer using the number average molecular weight of the polyol, as provided by manufacture or determined using hydroxyl titration, along with the percent conversion of the hydroxyl groups to acetoacetate. Use NMR and IR to determine the loss of the hydroxyl groups in the polyol and the quantitative appearance of the acetoacetate groups in the functionalized oligomer. Then, determine the number average molecular weight of the functionalized oligomer using the molecular weight of the acetoacetate.

All individual values and subranges from and including 200 grams/equivalent to 5000 grams/equivalent are included herein and disclosed herein; for example the functionalized oligomer can have an equivalent weight having a range with a lower limit of 200 grams/equivalent, 300 grams/equivalent, or 400 grams/equivalent to an upper limit of 5000 grams/equivalent, 4500 grams/equivalent, or 4000 grams/equivalent. For the functionalized oligomer, grams/equivalent may be calculated as the mass in grams of the functionalized oligomer containing one mole of Michael donor functionalities. While not being bound to theory, Michael donor functionalities, for purposes of this disclosure, are groups that in the presence of a carbon-Michael reaction catalyst form a carbanion that reacts with the carbon-carbon double or triple bond of a Michael acceptor group to form a carbon-carbon bond to the Michael acceptor group.

As mentioned, the functionalized oligomers disclosed herein can be employed in a composition, such as an open-cell foam forming composition. The open-cell foam forming compositions disclosed herein can include a multifunctional Michael acceptor. The multifunctional Michael acceptor and the functionalized oligomer can react to form the open-cell foam, e.g., via a carbon-Michael reaction. While not being bound to theory, Michael acceptor functionalities, for purposes of this disclosure, refer to an activated alkene having an aliphatic carbon-carbon double or triple bond alpha to a carbonyl (an "enone" group) or, a nitro group. The multifunctional Michael acceptor can have 2 Michael acceptor functionalities to 10 Michael acceptor functionalities. For example, the multifunctional Michael acceptor can have 2, 3, 4, 5, 6, 7, 8, 9, or 10 Michael acceptor functionalities.

The multifunctional Michael acceptor can be an acrylate. As used herein "acrylate" includes acrylates and (meth) acrylates.

Examples of acrylate include, but are not limited to, 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropane triacrylate, ethoxylated trimethylolpropane triacrylate, propoxylated trimethylolpropanetriacrylate, acrylated polyester oligomer, bisphenol A diacrylate, acrylated bisphenol A diglycidylether, ethoxylated bisphenol A diacrylate, tris(2-hydroxyethyl)isocyanurate triacrylate, acrylated aliphatic urethane oligomer, acrylated aromatic urethane oligomer, and combinations thereof, among others. One or more embodiments of the present disclosure provide the acrylate is selected from the group of trimethylolpropanetriacrylate, pentaerythritoltetraacrylate, di-trimethylolpropanetertraacrylate, di-pentaerythritolhexaacrylate, di-pentaerthritolpentaacrylate, diacrylate of diglycidyl ether bisphenol-A, ethoxylated trimethylolpropane triacrylate, tricyclodecanedimethanol diacrylate, and cyclohexanedimethanol diacrylate, and combinations thereof.

The multifunctional Michael acceptor and the functionalized oligomer can be included in the open-cell foam forming compositions such that multifunctional Michael acceptor functionalities and functionalized oligomer functionalities have a molar ratio of 0.5 moles of multifunctional Michael acceptor functionalities: 3.0 moles of functionalized oligomer functionalities to 3.0 moles of multifunctional Michael acceptor functionalities: 0.5 moles of the functionalized oligomer moles of multifunctional Michael acceptor functionalities to moles of the functionalized oligomer functionalities. All individual values and subranges from and including 0.5:3.0 to 3.0:0.5 moles of multifunctional Michael acceptor functionalities to moles of the functionalized oligomer functionalities are included herein and disclosed herein; for example, the open-cell foam forming compositions can include the multifunctional Michael acceptor and the functionalized oligomer such that multifunctional Michael acceptor functionalities and functionalized oligomer functionalities can have a molar ratio with an upper limit of 3.0:0.5, 2.8:0.5, or 2.6:0.5 to a lower limit of 0.5:3.0, 0.7:3.0, or 1.0:3.0 moles of multifunctional Michael acceptor functionalities to moles of the functionalized oligomer functionalities.

The open-cell foam forming compositions disclosed herein can include a catalyst, e.g., carbon-Michael reaction catalyst. The catalyst can include tertiary amine compounds, amidine compounds, quaternary ammonium hydroxides, alkali metal hydroxides, alkali metal alkoxides, alkali metal acetylacetonates, quaternary ammonium acetylacetonates, among others. Examples of the catalyst include, but are not limited to, tetramethyl ammonium hydroxide, tetraethyl ammonium hydroxide, tetrabutyl ammonium hydroxide, tetraoctyl ammonium hydroxide, trimethylamine, triethylamine, N-methylmorpholine, N-ethylmorpholine, N,N-dimethylbenzylamine, N,N-dimethylethanolamine, N,N,N,N'-tetramethyl-1,4-butanediamine, N,N-dimethylpiperazine, 1,4-diazobicyclo-2,2,2-octane, bis(dimethylaminoethyl) ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) aminoethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine, methyl-hydroxyethyl piperazine, and combinations thereof, among others. One or more embodiments of the present disclosure provide the catalyst is selected from the group of 1,1,3,3-tetramethylguanidine, 1,8-diazabicyclo[5.4.0]undec-7-ene, 1,5-diazabicyclo[4.3.0]non-5-ene, tetramethylammonium hydroxide, (2-hydroxyethyl)trimethylammonium hydroxide, potassium carbonate, potassium phosphate, potassium phenoxide, sodium phenoxide, tetraethylammonium hydroxide, and combinations thereof.

The catalyst can have a concentration of 0.01 moles of catalyst per equivalent of functionalized oligomer functionalities to 1 mole of catalyst per equivalent of functionalized oligomer functionalities. All individual values and subranges from and including 0.01 moles of catalyst per equivalent of functionalized oligomer functionalities to 1 mole of catalyst per equivalent of functionalized oligomer functionalities are included herein and disclosed herein; for example the catalyst can have a concentration with a lower limit of 0.01 moles, 0.02 moles, or 0.03 moles of catalyst per equivalent of functionalized oligomer functionalities to an upper limit of 1 moles, 0.98 moles, or 0.95 moles of catalyst per equivalent of functionalized oligomer functionalities.

The open-cell foam forming compositions disclosed herein can include a blowing agent. The blowing agent can include pentanes, fluorinated hydrocarbons, chlorofluorinated hydrocarbons, formate esters, carbon dioxide, and combinations thereof, among others. One or more embodiments of the present disclosure provide the blowing agent is selected from the group of cyclopentane, n-pentane, formaldehyde dimethylacetal, methylformate, methyl butane, 1,1,2,2,3-pentafluoropropane, 1,1,1,3,3-pentafluoropropane, 1,1,1,3,3-pentafluorobutane, 1,1,1,2,3,4,4,5,5,5-decafluoropentane, and combinations thereof.

The blowing agent can have a concentration of 0.5 weight percent to 50 weight percent based upon a total weight of the functionalized oligomer and the multifunctional Michael acceptor. All individual values and subranges from and including of 0.5 weight percent to 50 weight percent based upon a total weight of the functionalized oligomer and the multifunctional Michael acceptor are included herein and disclosed herein; for example the blowing agent can have a concentration with a lower limit of 0.5 weight percent, 1.0 weight percent, or 1.5 weight percent to an upper limit of 50 weight percent, 48 weight percent, or 45 weight percent based upon a total weight of the functionalized oligomer and the multifunctional Michael acceptor.

The open-cell foam forming compositions disclosed herein can include a surfactant. Examples of the surfactant include, but are not limited to, polyalkylene oxides and silicone based interfacial agents, such as organosilicone surfactants. Polyalkylene oxides, for example, can include random and/or block copolymers of ethylene and propylene oxides or ethylene and butylenes oxides, among others. An example of a polyalkylene oxide surfactant is a polyethylene oxide-co-butylene oxide triblock organic surfactant, which is sold under the tradename VORASURF™ 504 (available from The Dow Chemical Company). Examples of organosilicone surfactants include, but are not limited to, polysiloxane/polyether copolymers such as Tegostab™ (available from Evonik Industries), B-8462 and B8469, DABCO™ DC-198 surfactant (available from Air Products and Chemicals), and Niax™ L-5614 surfactant (available from Momentive Performance Products).

The surfactant can have a concentration of 0.1 weight percent to 5.0 weight percent based upon a total weight of the functionalized oligomer and the multifunctional Michael acceptor. All individual values and subranges from and including of 0.1 weight percent to 5.0 weight percent based upon a total weight of the functionalized oligomer and the multifunctional Michael acceptor are included herein and disclosed herein; for example the surfactant can have a concentration with a lower limit of 0.1 weight percent, 0.2 weight percent, or 0.3 weight percent to an upper limit of 5.0 weight percent, 4.8 weight percent, or 4.5 weight percent based upon a total weight of the functionalized oligomer and the multifunctional Michael acceptor.

The open-cell foam forming compositions can include one or more additives. Examples of the one or more additives include, but are not limited to, plasticizers, fillers, colorants, preservatives, odor masks, flame retardants, biocides, antioxidants, UV stabilizers, antistatic agents, foam cell nucleators, among others. Concentrations of the one or more additives in the open-cell foam forming compositions may have differing values for various applications.

As mentioned, the open-cell foam forming compositions disclosed herein can be utilized to provide an open-cell foam. Open-cell foams can be flexible foams or viscoelastic foams, in contrast to closed-cell foams that can be rigid foams. The open-cell foams disclosed herein can be formed by a chemical reaction, e.g., crosslinking, of the open-cell foam forming compositions.

The open-cell foam forming compositions can be heated to a temperature from 0° C. to 80° C., e.g., when crosslinking the open-cell foam forming compositions. All individual values and subranges from and including 0° C. to 80° C. are included herein and disclosed herein; for example the open-cell foam forming compositions can be heated to a temperature with a lower limit of 0° C., 3° C., or 5° C. to an upper limit of 80° C., 60° C., or 40° C.

As mentioned, crosslinking the open-cell foam forming composition can provide an open-cell foam. A foam can be determined to be an open-cell foam by a number of methods, such as ASTM D2856, for example. The open-cell foams disclosed herein are useful for various applications including, but not limited to, some insulation applications, packaging applications, automotive trim applications, filter applications, and acoustic applications, among others.

EXAMPLES

In the Examples, various terms and designations for materials were used including, for example, the following:
Polyol (ethoxylated glycerol, product reference IP 625, available from the Dow Chemical Company); polyol, (ethoxylated terephthalic acid, product reference IP 9001, available from the Dow Chemical Company), acetoacetate ester (tert-butyl 3-oxobutyrate, available from Sigma-Aldrich); multifunctional Michael acceptor (diacrylate of diglycidyl ether bisphenol-A, product reference CN 120Z, available from Sartomer), multifunctional Michael acceptor (di-trimethylolpropane tertraacrylate, product reference SR355, available from Sartomer), catalyst (1,1,3,3-tetramethylguanidine, available from Aldrich), surfactant (organosilicone surfactant, product reference TEGOSTAB® B 8469, available from Evonik Industries); 1,1,1,3,3-pentafluoropropane (blowing agent, product reference HFC 245fa, available from Honeywell Corporation).

Example 1

Functionalized Oligomer

A functionalized oligomer, Example 1, was prepared as follows. IP 625 (210 grams) and tert-butyl 3-oxobutyrate (204 grams) were added to a container. The contents of the container were heated to and maintained at 115° C. while stirring for 5 hours to provide transesterification and form Example 1. Tert-butanol, a by-product, was removed during the transesterification via distillation. After the 5 hours, vacuum was applied to the container for 10 minutes while the contents of the container were maintained at 115° C., then vacuum was applied to the container for 30 minutes while the contents of the container were maintained at 85° C. The contents of the container were cooled to room temperature to provide 285 grams of Example 1.

Infrared spectroscopy was used to analyze the IP 625 and Example 1. The IP 625 infrared spectroscopy analysis indicated absorption at approximately 3090-3670 cm$^{-1}$, which corresponded to O—H stretch for IP 625. The Example 1 infrared spectroscopy analysis showed absorption at approximately 3090-3670 cm$^{-1}$ had decreased to below detection limits, indicating transesterification of IP 625 and formation of Example 1. For Example 1, R$^1$ had the structure of Formula III

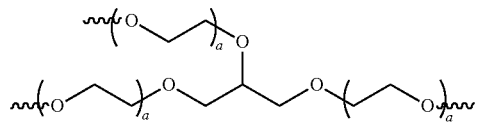

(Formula III)

where n had a value of 3, n2 had a value of 2 or 3, a had a value of 2 or 3, X had a value of 2, and Y had a value of 4.

Example 2

Functionalized Oligomer

A functionalized oligomer, Example 2, was prepared as follows. IP 9001 (244 grams) and tert-butyl 3-oxobutyrate (206 grams) were added to a container. The contents of the container were heated to and maintained at 115° C. while stirring for 5 hours to provide transesterification and form Example 2. Tert-butanol, a by-product, was removed during the transesterification via distillation. After the 5 hours, vacuum was applied to the container for 10 minutes while the contents of the container were maintained at 115° C., then vacuum was applied to the container for 30 minutes while the contents of the container were maintained at 85° C. The contents of the container were cooled to room temperature to 312 grams of Example 2.

Infrared spectroscopy was used to analyze the IP 9001 and Example 2. The IP 9001 infrared spectroscopy analysis indicated absorption at approximately 3110-3650 cm$^{-1}$, which corresponded to O—H stretch for IP 9001. The Example 2 infrared spectroscopy analysis showed absorption at approximately 3110-3650 cm$^{-1}$ had decreased to approximately zero, indicating transesterification of IP 9001 and formation of Example 2. For Example 2, $R^1$ had the structure of Formula IV

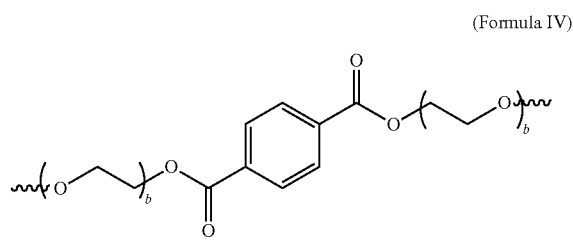

(Formula IV)

where n had a value of 2, m had a value of 3 to 4, b had a value of 3 to 4, X had a value of 2, and Y had a value of 4.

Example 3

Open-Cell Foam Forming Composition

An open-cell foam forming composition, Example 3, was prepared as follows. CN 120Z (25 grams) was heated to 60° C. The heated CN 120Z, SR355 (50 grams), 1,1,3,3-tetramethylguanidine (2.3 grams) and TEGOSTAB® B 8469 (1.97 grams) were added to a container and mechanically stirred for two minutes at approximately 900 rotations per minute. HFC 245fa (26.30 grams) was added to the contents of the container, which were mechanically stirred for an additional two minutes at approximately 900 rotations per minute. With stirring paused, Example 1 (56.51 grams) was added to the contents of the container to provide Example 3, then Example 3 was mechanically stirred for 30 seconds at approximately 2500 rotations per minute.

Example 4

Open-Cell Foam Forming Composition

An open-cell foam forming composition, Example 4, was prepared as follows. CN 120Z (25 grams) was heated to 60° C. The heated CN 120Z, SR355 (50 grams), 1,1,3,3-tetramethylguanidine (2.3 grams), and TEGOSTAB® B 8469 (2.1 grams) were added to a container and mechanically stirred for two minutes at approximately 900 rotations per minute. HFC 245fa (27.98 grams) was added to the contents of the container, which were mechanically stirred for an additional two minutes at approximately 900 rotations per minute. With stirring paused, Example 2 (64.89 grams) was added to the contents of the container to provide Example 4, and then Example 4 was mechanically stirred for 30 seconds at approximately 2500 rotations per minute.

Example 5

Open-Cell Foam

An open-cell foam, Example 5, was prepared as follows. After Example 3 was mechanically stirred, Example 3 was poured into a preheated (50° C.) aluminum mold where curing occurred to provide Example 5.

Example 6

Open-Cell Foam

An open-cell foam, Example 6, was prepared as follows. After Example 4 was mechanically stirred, Example 4 was poured into a preheated (50° C.) aluminum mold where curing occurred to provide Example 5.

Open cell percentages for Example 5 and Example 6 were determined by ASTM D2856 and are reported in Table 1.

TABLE 1

|  | Open cell percent |
|---|---|
| Example 5 | >90 |
| Example 6 | >90 |

The >90 open cell percent values reported in Table 1 show that both Example 5 and Example 6 were open-cell foams.

Foam densities for Example 5 and Example 6 were determined by ASTM D1622 and are reported in Table 2.

TABLE 2

|  | Foam density (pounds per cubic foot) |
|---|---|
| Example 5 | 2.3 |
| Example 6 | 2.4 |

The data in Table 2 show that both Example 5 and Example 6 have a foam density that is desirable for some open-cell foam applications.

What is claimed:

1. A functionalized oligomer of Formula (I):

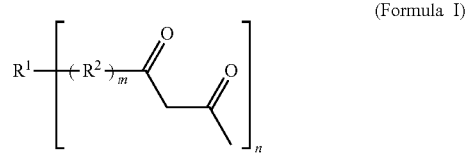

(Formula I)

in which R¹ is a structure of Formula IV:

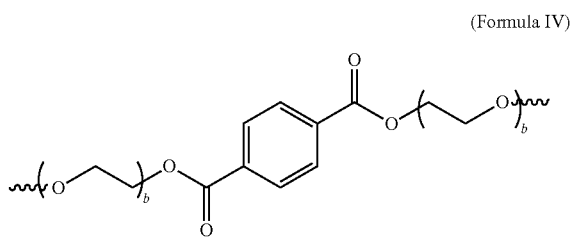

(Formula IV)

and R² has a formula —$C_XH_YO$—, wherein n has a value of 2, m is an integer having a value from 3 to 4, b has a value of 3 to 4, X has a value of 2, and Y has a value of 4.

2. An open-cell foam forming composition comprising: a functionalized oligomer of claim 1; and a multifunctional Michael acceptor.

3. The composition of claim 2, wherein the functionalized oligomer has an equivalent weight of 200 grams/equivalent to 5000 grams/equivalent.

4. The composition of claim 2, wherein the multifunctional Michael acceptor is a multifunctional acrylate.

5. The composition of claim 4, wherein the multifunctional acrylate is selected from the group of trimethyloipropanetri-acrylate, pentaerythritoltetra-acrylate, di-trimethylolpropanetertra-acrylate, di-pentaerythritolhexa-acrylate, di-pentaerthritolpenta-acrylate, diacrylate of diglycidyl ether bisphenol-A, ethoxylated trimethylolpropane triacrylate, tricyclodecanedimethanol diacrylate, cyclohexanedimethanol diacrylate, and combinations thereof.

6. The composition of claim 2, wherein multifunctional Michael acceptor functionalities and functionalized oligomer functionalities have a molar ratio of 0.5:3.0 to 3.0:0.5 moles of multifunctional Michael acceptor functionalities to moles of the functionalized oligomer functionalities.

7. The composition of claim 2, including a catalyst having a concentration of 0.01 moles of catalyst per equivalent of functionalized oligomer functionalities percent to 1 mole of catalyst per equivalent of functionalized oligomer functionalities.

8. The composition of claim 7, wherein the catalyst is selected from the group of 1,1,3,3-tetramethylguanidine, 1,8-diazabicyclo[5.4.0]undec-7-ene, 1,5-diazabicyclo[4.3.0]non-5-ene, tetramethylammonium hydroxide, (2-hydroxyethyl)trimethylammonium hydroxide, potassium carbonate, potassium phosphate, potassium phenoxide, sodium phenoxide, tertraethylammonium hydroxide, and combinations thereof.

9. The composition of claim 2, including a blowing agent having a concentration of 0.5 weight percent to 50 weight percent based upon a total weight of the functionalized oligomer and the multifunctional Michael acceptor.

10. The composition of claim 9, wherein the blowing agent is selected from the group of cyclopentane, n-pentane, formaldehyde dimethylacetal, methylformate, methyl butane, 1,1,2,2,3-pentafluoropropane, 1,1,1,3,3-pentafluoropropane, 1,1,1,3,3-pentafluorobutane, 1,1,1,2,3,4,4,5,5,5-decafluoropentane, and combinations thereof.

11. The composition of claim 2, including a surfactant having a concentration of 0.1 weight percent to 5.0 weight percent based upon a total weight of the functionalized oligomer and the multifunctional Michael acceptor.

12. An open-cell foam that is a reaction product of open-cell foam forming composition of claim 2.

* * * * *